(12) United States Patent
Sripathi Panditharadhya et al.

(10) Patent No.: US 9,354,940 B2
(45) Date of Patent: May 31, 2016

(54) PROVISIONING TENANTS TO MULTI-TENANT CAPABLE SERVICES

(75) Inventors: Nagalinga Durga Prasad Sripathi Panditharadhya, Sammamish, WA (US); Markus Horstmann, Woodinville, WA (US); Girish Nagaraja, Kirkland, WA (US); Clemens Friedrich Vasters, Kirkland, WA (US); David Wortendyke, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 554 days.

(21) Appl. No.: 13/354,197

(22) Filed: Jan. 19, 2012

(65) Prior Publication Data

US 2013/0191842 A1 Jul. 25, 2013

(51) Int. Cl.
*G06F 9/46* (2006.01)
*G06F 9/50* (2006.01)
*G06F 15/173* (2006.01)
(Continued)

(52) U.S. Cl.
CPC ............ *G06F 9/5072* (2013.01); *G06F 9/5083* (2013.01); *G06F 9/44521* (2013.01); *G06F 9/45504* (2013.01); *G06F 9/5011* (2013.01); *G06F 15/17362* (2013.01); *G06F 15/17375* (2013.01)

(58) Field of Classification Search
CPC ......... G06F 9/46; G06F 9/455; G06F 9/5011; G06F 9/5027; G06F 15/173; G06F 15/17362; G06F 15/17375
USPC ........................................................ 718/105
See application file for complete search history.

(56) References Cited

U.S. PATENT DOCUMENTS

| 7,543,060 B2* | 6/2009 | Ishida et al. ................. 709/226 |
| 7,644,410 B1* | 1/2010 | Graupner et al. ............. 718/104 |
| 7,701,882 B2* | 4/2010 | Jones et al. ................... 370/260 |

(Continued)

FOREIGN PATENT DOCUMENTS

WO    WO 2011156108 A2    12/2011

OTHER PUBLICATIONS

"Multi-Tenant Data Architecture", Retrieved on: Aug. 26, 2011, Available at: http://msdn.microsoft.com/en-us/library/aa479086.aspx#mlttntda_topic2.

(Continued)

*Primary Examiner* — Xuxing Chen
(74) *Attorney, Agent, or Firm* — Ben Tabor; Doug Barker; Micky Minhas (57) ABSTRACT

The present invention extends to methods, systems, and computer program products for implementing a tenant provisioning system in a multi-tenancy architecture using a single provisioning master in the architecture, and a data center provisioner in each data center in the architecture. The provisioning master receives user requests to provision a tenant of a service and routes such requests to an appropriate data center provisioner. Each service in the multi-tenancy architecture implements a common interface by which the corresponding data center provisioner can obtain a common indication of load from each different service deployed in the data center thus facilitating the selection of a scale unit on which a tenant is provisioned. The common interface also enables a service to dynamically register (i.e. without redeploying the tenant provisioning system) with the provisioning master as a multi-tenancy service by registering an endpoint address with the provisioning master.

18 Claims, 5 Drawing Sheets

(51) Int. Cl.
*G06F 9/455* (2006.01)
*G06F 9/445* (2006.01)

(56) References Cited

U.S. PATENT DOCUMENTS

| | | | |
|---|---|---|---|
| 7,908,622 B1 | 3/2011 | Blevins | |
| 8,005,979 B2* | 8/2011 | Dinker et al. | 718/105 |
| 2008/0239985 A1 | 10/2008 | Karve et al. | |
| 2009/0049056 A1 | 2/2009 | Shutt et al. | |
| 2010/0054439 A1 | 3/2010 | Salame et al. | |
| 2011/0138034 A1 | 6/2011 | Brookbanks et al. | |
| 2011/0153684 A1 | 6/2011 | Yung | |
| 2011/0153938 A1 | 6/2011 | Verzunov et al. | |
| 2011/0302503 A1 | 12/2011 | Cahill et al. | |
| 2013/0067469 A1* | 3/2013 | Das et al. | 718/1 |

OTHER PUBLICATIONS

"Enhanced Secure Multi-Tenancy Design Guide", Retrieved on: Aug. 26, 2011, Available at: http://www.cisco.com/en/US/docs/solutions/Enterprise/Data_Center/Virtualization/securecldg_V2.html.

"Simplified Tenant Provisioning using IBM Entry Level Middleware", Retrieved on: Aug. 26, 2011, Available at: http://public.dhe.ibm.com/software/dw/demos/saasprovision/SelfProvisioningDemoScript.pdf.

"End-to-End Quality of Service", Retrieved on: Aug. 26, 2011, Available at: http://www.netapp.com/us/communities/tech-ontap/tot-smt-qos-1001.html.

"Cloud Architecture: The Scheduler-Agent-Supervisor Pattern", Retrieved on: Oct. 7, 2011, Available at: http://blogs.msdn.com/b/clemensv/archive/2010/09/27/cloud-architecture-the-scheduler-agent-supervisor-pattern.aspx.

"First Office Action and Search Report Issued in Chinese Patent Application No. 201380006023.7", Mailed Date: Dec. 22, 2015, 12 Pages.

Alteon Websystems Inc, "Enhancing Web User Experience with Global Server Load Balancing", Jun. 1999, 8 pages, Available at <<http://www.alteonwebsystems.com/products/white_papers/GSLB/index.shtml>>.

"Extended European Search Report issued in European Patent Application No. 13738586.0", Mailed Date: Apr. 12, 2016, 9 pages.

* cited by examiner

PROVISIONING TENANTS TO MULTI-TENANT CAPABLE SERVICES

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

Clouds of computing systems are being used more and more to store data and host services. A cloud is a network of interconnected computing resources where the actual hardware used to execute a service is abstracted from the service. In such clouds, services are often configured to be multi-tenant capable. A multi-tenant service is a service that serves multiple customers (or tenants). In a multi-tenant service, each tenant's data and communications with the service are partitioned from those of other tenants. In this sense, it appears to each tenant that the tenant owns the multi-tenant service.

Many types of services are implemented as multi-tenant services including database services, caching services, service bus services, composite applications, workflow services, etc. In essence, any service that many customers desire to access can be provisioned as a multi-tenant service.

Figure 1:
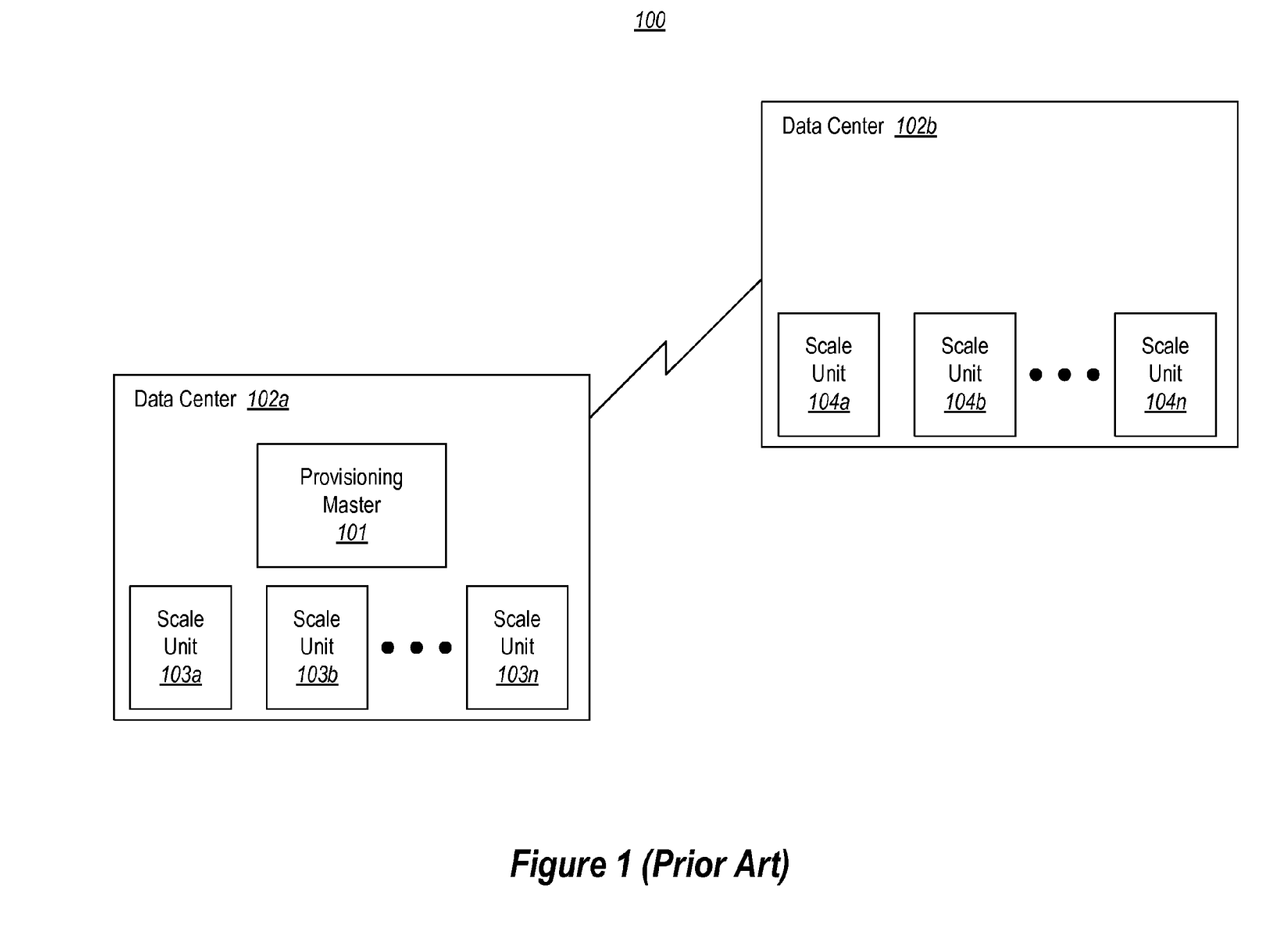
FIG. 1 illustrates a prior art multi-tenancy architecture.

One common multi-tenancy architecture 100 is depicted in FIG. 1. In this common architecture, a provisioning master 101 acts as the gateway to multi-tenancy architecture 100. Provisioning master 101 receives requests from customers desiring to provision a multi-tenancy service within architecture 100. The customer request can specify a type of service, a predicted load for the service, and a desired geographical location for the service among other things.

Based on this information, provisioning master 101 determines which data center to route the customer request to. For example, data center 102a can be located in the South West United States whereas data center 102b can be located in the East United States. If the customer is located in California and the majority of its usage of the requested service will be from client computers located in California, the customer request can be routed to data center 102a since it is geographically more proximate to the customer.

In multi-tenancy architecture 100, each data center contains scale units. For example, data center 102a includes scale units 103a-103n, and data center 102b includes scale units 104a-104n. A scale unit hosts a service. A data center generally includes multiple sets of scale units each hosting the same service. For example, a data center can include eight scale units that each host a cache service, four scale units that each host a service bus service, etc.

In this specification, a service on a scale unit is referred to as a service instance (or instance of a service) to distinguish between other instances of the same service on other scale units. For example, if scale units 103a and 103b both host a cache service, each cache service can be referred to as a cache service instance.

These scale units comprise a logical grouping of services within a data center. For example, scale unit 103a in data center 102a can comprise a logical grouping of multi-tenancy caches. Each scale unit is isolated from other scale units (i.e. one scale unit can be deployed or removed without affecting another scale unit).

In multi-tenancy architecture 100, each scale unit includes a per-scale unit provisioner. Each per-scale unit provisioner is responsible for interfacing with provisioning master 101 to receive requests to provision a tenant for the service hosted by the scale unit, as well as to allocate the resources within the scale unit to provision the tenant. There is a set of common operations that are performed whenever a tenant is provisioned to any type of service. For example, each time a tenant is provisioned to a service, one or more DNS records are created. The per-scale unit provisioner is responsible for performing these operations. In addition, there are other operations that are unique to each type of service that the per-scale unit provisioner also performs when a tenant is provisioned.

Accordingly, provisioning master 101 must communicate with a number of different per-scale unit provisioners in each data center, and each per-scale unit provisioner must perform a number of operations each time a tenant is provisioned to the service hosted by the scale unit.

In addition to provisioning tenants based on geography, tenants can be provisioned based on load balancing considerations. For example, once a data center is selected to host a tenant for a particular service, a particular scale unit within the data center can be selected. Which scale unit is selected can be based on the respective loads of each scale unit in the data center providing the desired service.

In multi-tenancy architecture 100, performing this load balancing requires additional overhead within provisioning master 101. Specifically, because provisioning master 101 is tasked with provisioning a tenant to a particular scale unit, provisioning master 101 must understand the different criteria used for determining load balancing for each of the various types of multi-tenant services. For example, determining respective load among cache scale units can require evaluating very different criteria than that used for determining respective load among service bus service scale units.

BRIEF SUMMARY

The present invention extends to methods, systems, and computer program products for implementing a tenant provisioning system in a multi-tenancy architecture using a single provisioning master in the architecture, and a data center provisioner in each data center in the architecture. The provisioning master receives user requests to provision a tenant of a service and routes such requests to an appropriate data center provisioner.

Each service in the multi-tenancy architecture implements a common interface by which the corresponding data center provisioner can obtain a common indication of load from each different service deployed in the data center thus facilitating the selection of a scale unit on which a tenant is provisioned. The common interface also enables a service to dynamically register (i.e. without redeploying the tenant provisioning system) with the provisioning master as a multi-tenancy service by registering an endpoint address with the provisioning master.

In one embodiment, a request is received at a provisioning master. The request is received from a user and requests that a tenant of a service be provisioned for the user at a geographic location. The provisioning master selects a data center in the geographic location. The provisioning master sends a provisioning request to a data center provisioner at the selected data center. The provisioning request identifies the type of service to which the tenant should be provisioned.

The data center provisioner determines which scale units in the data center host the service. The data center provisioner sends a request to the service instance on each of the determined scale units requesting the load on each scale unit. The request is made via a common interface that is implemented by each service in the multi-tenancy environment. The data center provisioner selects one of the service instances to host the tenant based on the load on each scale unit.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for implementing a tenant provisioning system in a multi-tenancy architecture using a single provisioning master in the architecture, and a data center provisioner in each data center in the architecture. The provisioning master receives user requests to provision a tenant of a service and routes such requests to an appropriate data center provisioner.

Each service in the multi-tenancy architecture implements a common interface by which the corresponding data center provisioner can obtain a common indication of load from each different service deployed in the data center thus facilitating the selection of a scale unit on which a tenant is provisioned. The common interface also enables a service to dynamically register (i.e. without redeploying the tenant provisioning system) with the provisioning master as a multi-tenancy service by registering an endpoint address with the provisioning master.

In one embodiment, a request is received at a provisioning master. The request is received from a user and requests that a tenant of a service be provisioned for the user at a geographic location. The provisioning master selects a data center in the geographic location. The provisioning master sends a provisioning request to a data center provisioner at the selected data center. The provisioning request identifies the type of service to which the tenant should be provisioned.

The data center provisioner determines which scale units in the data center host the service. The data center provisioner sends a request to the service instance on each of the determined scale units requesting the load on each scale unit. The request is made via a common interface that is implemented by each service in the multi-tenancy environment. The data center provisioner selects one of the service instances to host the tenant based on the load on each scale unit.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or transport desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
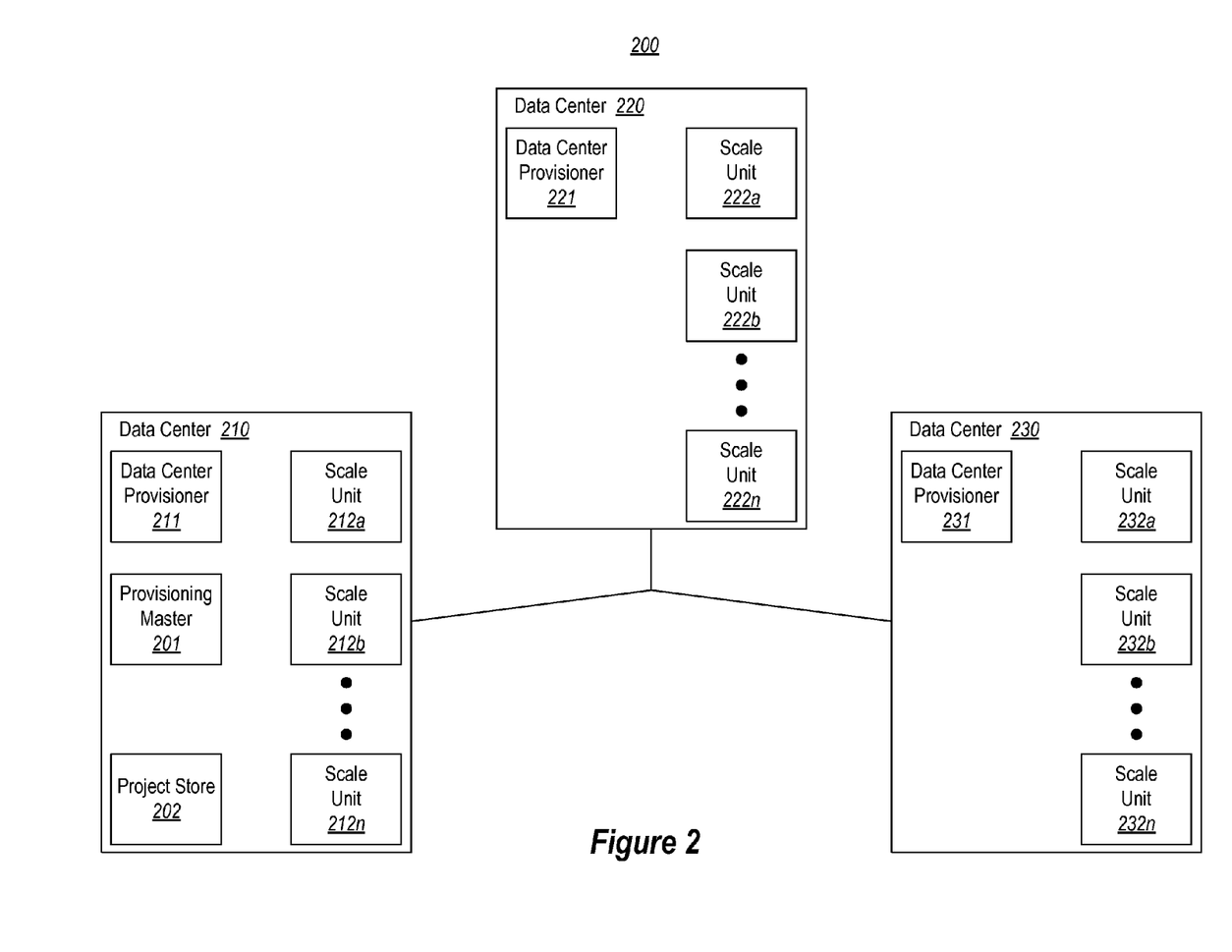
FIG. 2 illustrates an exemplary multi-tenancy architecture in which the tenant provisioning system of the present invention can be implemented.

FIG. 2 illustrates an example computer architecture 200 that facilitates implementing a multi-tenancy environment. Referring to FIG. 2, computer architecture 200 comprises a cloud of interconnected data centers including data centers 210, 220, and 230. Each of the data centers is connected to one another over (or is part of) a network, such as, for example, a Local Area Network ("LAN"), a Wide Area Network ("WAN"), and even the Internet. Accordingly, each of the depicted data centers as well as any computer systems connected to a data center, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

In multi-tenancy environment 200, a single provisioning master 201 is used to provision tenant requests to scale units in the various data centers of multi-tenancy environment 200. Similarly, a single project store 202 is used to store service and tenant information. In FIG. 2, provisioning master 201 and project store 202 are shown as being part of data center 210.

Each data center includes a data center provisioner and a number of scale units. Each data center provisioner is tasked with provisioning tenants to services on scale units within the respective data center. Each scale unit comprises a logical unit of isolation for hosting a particular type of multi-tenant service. For example, a data center could include five scale units for hosting tenants of a cache service, two scale units for hosting tenants of a service bus service, eight scale units for hosting tenants of a workflow service, etc.

For example, as shown in FIG. 2, data center 210 includes data center provisioner 211 and scale units 212a-212n; data center 220 includes data center provisioner 221 and scale units 222a-222n; and data center 230 includes data center provisioner 231 and scale units 232a-232n. Each of data center provisioners 211, 221, and 231 communicate with provisioning master 201 to provision tenants within the respective data center.

Multi-tenancy environment 200 enables a service to register to be hosted as a multi-tenancy service by implementing a common interface and registering an endpoint address of the service with provisioning master 201. In multi-tenancy environment 200, a service (i.e. an instance of the service) is deployed to a scale unit. Each instance of a service has a unique endpoint address. Accordingly, each scale unit is associated with the unique endpoint address of the instance of the service that it hosts.

By requiring each service to implement the common interface, provisioning master 201 (and data center provisioners as described below) can communicate with each registered service in a similar manner. Each registered endpoint address can be stored in project store 202 along with information regarding the type of service associated with the endpoint, the data center where the service is located, and an identifier of the scale unit hosting the service. Provisioning master 201 uses this information when provisioning tenants to a service. Additional details regarding the common interface are provided below.

A user can submit a request to provisioning master 201 for a tenant to be provisioned for the user. Such requests can specify the type of service and possibly the geographic location of a desired data center where the tenant will be provisioned. For example, a user can submit a request to provisioning master 201 to provision a tenant of a cache service in a data center in the South West United States. Provisioning master 201 can create a tenant record in project store 202 to store information about the tenant.

After receiving the request, provisioning master 201 determines which data center the request should be routed to. If the request specifies a geographic location, this can be accomplished by selecting the data center in the geographic location. If the request does not specify a geographic location, provisioning master 201 can select a data center based on various criteria such as load balancing as further described below.

Once a data center is identified, provisioning master 201 accesses project store 202 to determine all the endpoint addresses of instances of the service that are hosted by scale units in the identified data center. These endpoint addresses and an indication of the type of service requested are sent to the data center provisioner at the selected data center. The data center provisioner then handles the remaining steps to provision the tenant.

Figure 3:
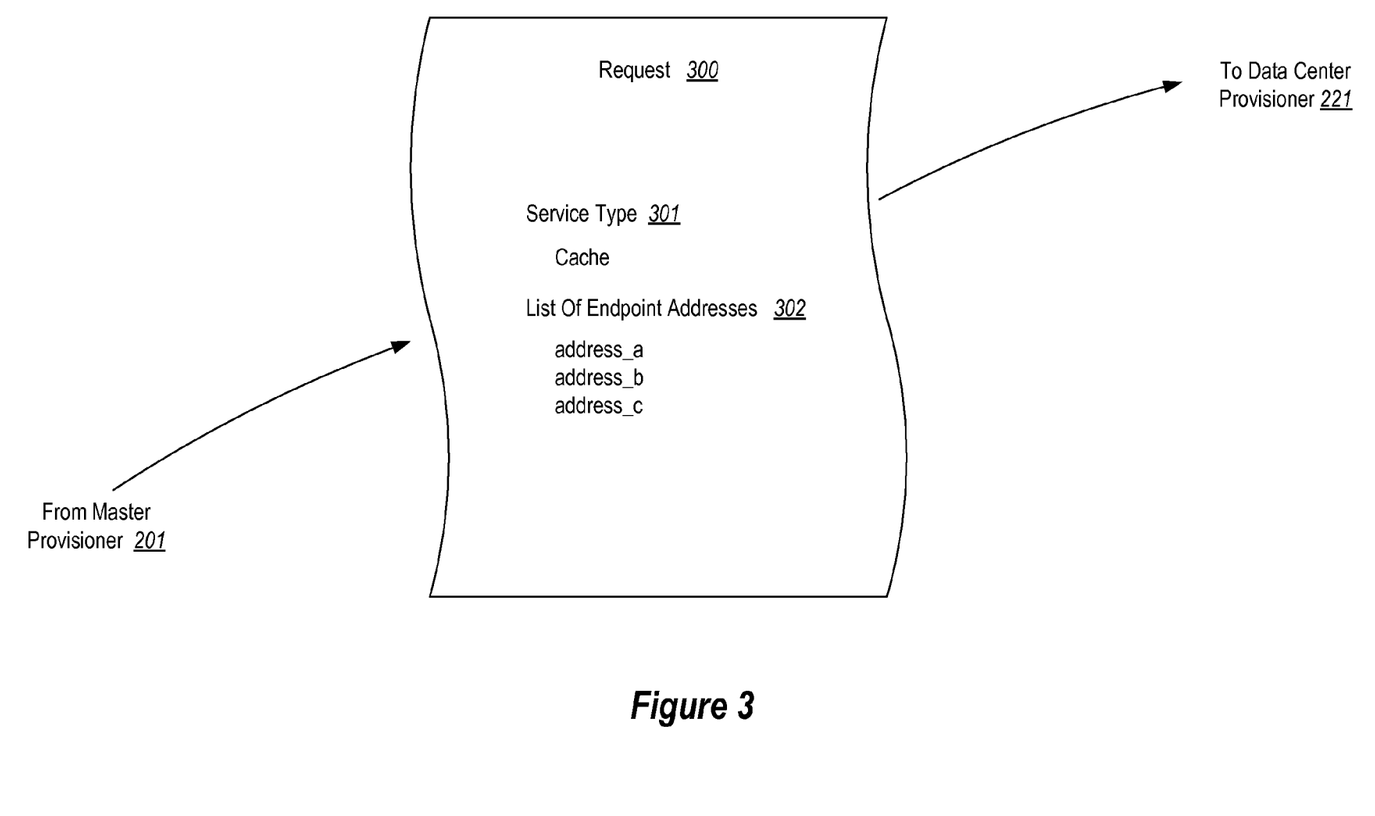
FIG. 3 illustrates an exemplary tenant provisioning request.

FIG. 3 illustrates an exemplary request 300 that can be transmitted by provisioning master 201 to any of the data center provisioners in multi-tenancy environment 200. Request 300 includes an indication 301 of the requested type of service and a list 302 of endpoint addresses of the service on each scale unit in the selected data center that are registered in project store 202. Request 300 represents a user's request to provision a tenant of a cache service. As indicated in request 300, three scale units with endpoint addresses of address_a, address_b, and address_c host cache services within the selected data center.

For example, if data center 220 is selected to host the tenant, list 302 of request 300 can include the endpoint address of each instance of the cache service being hosted by a scale unit in data center 220. In this case, data center provisioner 221 will receive request 300 from provisioning master 201. In response to receiving request 300, data center provisioner 221 requests the load from each of the instances of the cache service whose endpoint address is included in list 302.

These requests can be made via the common interface. Specifically, the common interface implemented by each service can include a get load function that a data center provisioner can call to request the load on a particular scale unit hosting the service. The get load function can return a common indication of load (e.g. a number on a scale of 0-10). Accordingly, each service can respond to the get load request by providing a common indication thus simplifying the load balancing determination performed by a data center provisioner. Specifically, the data center provisioner need not understand service specific load indications because each service provides a common indication of load.

In some embodiments, the get load function can return a current indication of load that the data center provisioner uses to select an appropriate service instance. Alternatively, the get load function can return a predicted indication of load (i.e. a predicted load if the tenant were provisioned by the service). In some embodiments, both a current and a predicted indication of load could be returned and used by the data center provisioner to select a service instance.

Once each scale unit has provided a common indication of load, the data center provisioner can select an appropriate instance of the service to host the tenant. In other words, the data center provisioner can select the scale unit that has the lowest load to host the tenant. For example, referring to FIGS. 2 and 3, if scale units 222a, 222b, and 222n host the cache service in data center 220 (and have endpoint addresses address_a, address_b, and address_c respectively), data center provisioner 221 can select scale unit 222a if the instance of the cache service hosted on scale unit 222a indicates that it has the lowest load.

Once an instance of a service is selected to host the tenant, the data center provisioner sends the endpoint address of the service instance to project store 202 to be stored with a tenant record indicating where the tenant is hosted. Using the same example as above, data center provisioner 221 can send the endpoint address of the service instance being hosted on scale unit 222a to project store 202.

Additionally, the data center provisioner calls a get DNS entries function of the common interface implemented by the selected service instance. The get DNS entries function returns a list of CNAME mappings that need to be created as part of the tenant provisioning process. Once the data center provisioner obtains the CNAME mappings, the data center provisioner creates corresponding CNAME mappings in the DNS.

At this point, the data center provisioner calls a create function of the common interface implemented by the selected service instance. The create function causes the selected service instance to perform any service specific provisioning steps (e.g. creating entries within a service specific tenants table). Once the selected service instance finishes any service specific provisioning steps, the selected service instance notifies the data center provisioner. The data center provisioner then reports the completion of the provisioning of the tenant to provisioning master 201. Provisioning master 201 can then update project store 202 accordingly so that the tenant record indicates that the tenant is active.

In addition to the get load function, the get DNS entries function, and the create function, the common interface can also include a delete function by which the data center provisioner can request the deletion of a tenant from a service, a disable function by which the data center provisioner can disable a tenant (e.g. cause the service to stop responding to requests to the tenant), an enable function by which the data center provisioner can enable a disabled tenant, and a quotas changed function by which the data center provisioner can notify the service that a user has requested a change to a quota associated with the tenant.

Figure 4:
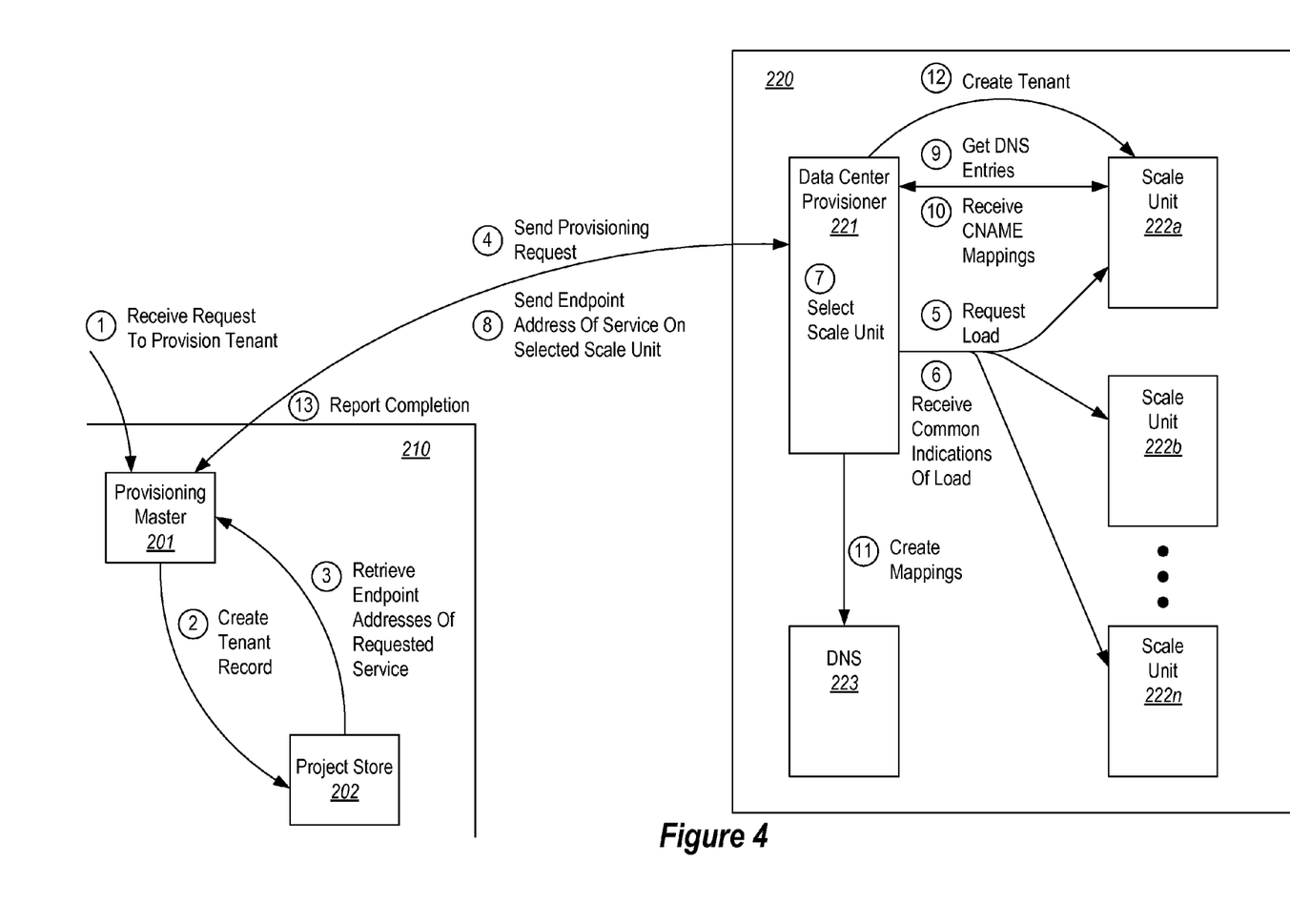
FIG. 4 illustrates an exemplary data flow during the provisioning of a tenant to a service.

FIG. 4 illustrates an exemplary data flow of the provisioning process described above. FIG. 4 includes data center 210 which includes provisioning master 201 and project store 202, and data center 220 which includes data center provisioner 221, scale units 222a-222n, and DNS 223. The same data flow can also be performed with any other data center in multi-tenancy environment 200.

The data flow of FIG. 4 assumes that a number of endpoint addresses of a requested service have already been registered with provision master 201. As stated above, each time a new instance of a service is deployed on a scale unit, the endpoint address of the service instance is registered with provisioning master 201 and stored in project store 202.

At step 1, a request to provision a tenant of a particular service type is received by provisioning master 201 from a user. This request can specify a geographic location where the tenant should be provisioned. Or, if no geographic location is specified, provisioning master 201 can select an appropriate data center. In either case, data center 220 is selected. At step 2, provisioning master 201 creates a tenant record in project store 202. The tenant record can indicate the type of service and the data center where the tenant is to be provisioned.

At step 3, provisioning master 201 accesses project store 202 (e.g. a registered endpoint address table in project store 202) to retrieve the endpoint address of each instance of the requested service that is deployed at data center 220). At step 4, provisioning master 201 sends a tenant provisioning request to data center 220. This request includes an indication of the requested service and a list of each identified endpoint address.

Figure 5:
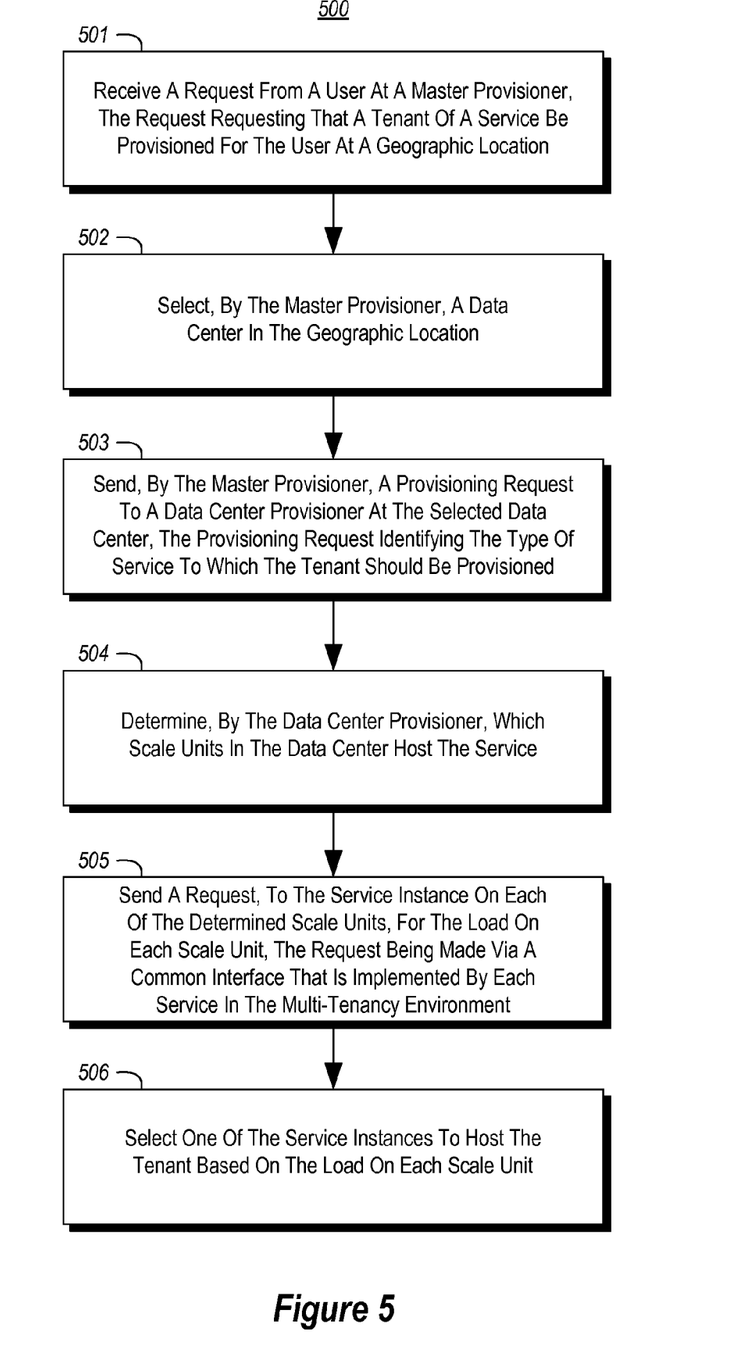
FIG. 5 illustrates a flow chart of an example method for provisioning a tenant to a service within a multi-tenancy environment.

At step 5, data center provisioner 221 requests the load of each instance of the requested service as identified by the endpoint addresses in the received provisioning request. The load is requested by calling a function of a common interface implemented by services of any type. In FIG. 5, the load request is shown as going to each of the depicted scale units, thus representing that each scale unit in data center 220 hosts the same service. However, a data center can, and usually does, include scale units hosting different types of services.

At step 6, each queried instance of the service returns a common indicator in response to the load request. For example, each service instance can return a number on a scale, such as from 0 to 10. At step 7, data center provisioner 221 selects scale unit 222a to host the tenant based on the load returned by the service instance deployed on scale unit 222a. For example, the service instance deployed on scale unit 222a may report the lowest common indicator indicating that its load is lowest of the scale units hosting the requested service.

At step 8, data center provisioner 221 sends the endpoint address of the service instance on selected scale unit 222a to provisioning master 201. Provisioning master 201 stores the endpoint address in the tenant record in project store 202.

At step 9, data center provisioner 221 calls the get DNS entries of the common interface implemented by the service instance on data center 222a. At step 10, the service instance on scale unit 222a returns a number of CNAME mappings. At step 11, data center provisioner 221 registers CNAME records with DNS 223 in accordance with the received CNAME mappings.

At step 12, data center provisioner 221 calls the create function of the common interface implemented by the service instance on scale unit 222a. Finally, at step 13, data center provisioner 221 reports the completion of the provisioning of the tenant on scale unit 222a to provisioning master 201 to allow provisioning master 201 to update the tenant record in project store 202 accordingly.

The tenant record in project store 202 can be used to track the state of the provisioning of a tenant. For example, when the tenant record is initially created in step 2, the tenant record can include a state of Init indicating that the provisioning process has been initiated. Similarly, when the provisioning of the tenant has been completed, the tenant record can include a state of Active. Provisioning master 201 can use the state of a tenant record to initiate new requests to provision a tenant. For example, if a provisioning request has failed, the state of the tenant record will indicate such failure (e.g. by remaining as Init for a predetermined amount of time, or by being set to another state indicating failure of a previous provisioning request). In such scenarios, provisioning master 201 can initiate new provisioning requests.

FIG. 5 illustrates a flow chart of an example method 500 for provisioning tenants of services within a multi-tenancy environment. Method 500 will be described with respect to FIGS. 2 and 3.

Method 500 includes an act 501 of receiving a request from a user at a provisioning master. The request requests that a tenant of a service be provisioned for the user at a geographic location. For example, provisioning master 201 can receive a request from a user that requests that a tenant of a cache service be provisioned in a data center located in the South West United States Method 500 includes an act 502 of selecting, by the provisioning master, a data center in the geographic location. For example, provisioning master 201 can select data center 220 if data center 220 is located in the South West United States.

Method 500 includes an act 503 of sending, by the provisioning master, a provisioning request to a data center provisioner at the selected data center. The provisioning request identifying the type of service to which the tenant should be provisioned. For example, provisioning master 201 can send request 300 to data center provisioner 221. Request 300 identifies a cache service as the type of service to which a tenant should be provisioned.

Method 500 includes an act 504 of determining, by the data center provisioner, which scale units in the data center host the service. For example, data center provisioner 221 can access request 300 to determine which scale units host an instance of the cache service. Alternatively, data center provisioner 221 can access a table or other data structure stored locally at data center 220 to determine which scale units in data center 220 host the cache service.

Method 500 includes an act 505 of sending a request, to the service instance on each of the determined scale units, for the load on each scale unit. The request is made via a common interface that is implemented by each service in the multi-tenancy environment. For example, data center provisioner 221 can request the load on each scale units 222a-222n which host the cache service using the common interface.

Method 500 includes an act 506 of selecting one of the service instances to host the tenant based on the load on each scale unit. For example, data center provisioner 221 can select one of scale units 222a-222n having the lowest load on which to provision a tenant of the cache service. The determination of which scale unit has the lowest load can be based on actual current load or predicted load if the tenant were provisioned on the scale unit.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for provisioning tenants of services within a multi-tenancy environment that includes a plurality of data centers, each data center having a plurality of scale units that each host a service and one of the plurality of data centers having a provisioning master and a project store, the method comprising:

the provisioning master receiving a request from a user, the request requesting that a tenant of a service be provisioned for the user at a geographic location;

the provisioning master selecting a data center in the geographic location;

the provisioning master sending a provisioning request to a data center provisioner at the selected data center, the provisioning request identifying the type of service to which the tenant should be provisioned;

the data center provisioner determining which scale units in the data center host the service;

the data center provisioner sending a request, to a service instance on each of the determined scale units, for the load on each scale unit, the request being made via a common interface that is implemented by each service in the multi-tenancy environment;

the data center provisioner selecting one of the service instances to host the tenant based at least in part on the load on each scale unit; and the data center provisioner sending an endpoint address of the selected service instance to the project store to be stored with a tenant record to indicate where the tenant is hosted.

2. The method of claim 1, wherein the provisioning request includes a list of endpoint addresses of the service instances in the data center.

3. The method of claim 2, wherein determining, by the data center provisioner, which scale units in the data center host the service comprises accessing the list of endpoint addresses in the provisioning request.

4. The method of claim 1, wherein the common interface represents load using a common indicator such that each service of any type informs the data center provisioner of the load on the corresponding scale unit using the common indicator.

5. The method of claim 4, wherein the common indicator comprises a number on a scale.

6. The method of claim 1, wherein selecting one of the service instances to host the tenant based on the load on each scale unit comprises selecting the service instance on the scale unit with the lowest load.

7. The method of claim 1, further comprising:
requesting, by the data center provisioner, that the selected service instance provision the tenant, the request being made via the common interface such that the data center provisioner can request provisioning of a tenant on any service using the same common interface.

8. The method of claim 1, further comprising:
sending, by the data center provisioner, a notification of the selected service instance to the provisioning master; and
storing, by the provisioning master, the tenant record in the project store to indicate where the tenant was provisioned.

9. The method of claim 1, further comprising:
requesting, by the data center provisioner, DNS entries from the selected service instance, the request being made via the common interface.

10. The method of claim 9, further comprising registering the DNS entries with a DNS.

11. A tenant provisioning system comprising:
a plurality of data centers, each data center including:
a data center provisioner; and
a plurality of scale units that each host a service, wherein each data center provisioner communicates with the service on each of the plurality of scale units via a common interface to provision tenants of the service, wherein the service registers with the provisioning master as a multi-tenancy service by providing an endpoint address of the service to the provisioning master;
wherein one of the data centers includes a provisioning master and a project store,
the provisioning master communicating with each of the data center provisioners to route requests to provision tenants on an appropriate one of the plurality of data centers, and, when the provisioning master receives a request to provision a tenant of a particular type of service at a particular data center, the provisioning master sends, to the data center provisioner in the particular data center, the endpoint address of each service of the particular type that is hosted on a scale unit within the particular data center, and
the project store storing tenant records indicating on which of the plurality of data centers a particular tenant is hosted.

12. The system of claim 11, wherein the common interface includes a get load function by which each service provides a common indication of load, and wherein the data center provisioner calls the get load function on each service of the particular type to request the load of each service.

13. The system of claim 12, wherein the common indication of load comprises a number on a scale.

14. The system of claim 12, wherein the data center provisioner selects one of the services to provision the tenant based on the load returned by each service.

15. The system of claim 14, wherein the service is selected based on both a current load and a predicted load if the tenant were provisioned to the service.

16. The system of claim 14, wherein the common interface includes a create function by which a data center provisioner requests any service to provision a tenant on the service, and wherein the data center provisioner calls the provision tenant function on the selected service.

17. The system of claim 14, wherein the data center provisioner returns the endpoint address of the selected service to the provisioning master to be stored in the project store.

18. A method for provisioning tenants of services within a multi-tenancy environment that includes a plurality of data centers, each data center having a plurality of scale units that each host a service, the method comprising:
a provisioning master receiving a request from a user, the request requesting that a tenant of a service be provisioned for the user at a geographic location;
the provisioning master selecting a data center in the geographic location;
the provisioning master identifying a number of endpoint addresses of service instances of the requested service that are hosted in the selected data center;
the provisioning master sending a provisioning request to a data center provisioner at the selected data center, the provisioning request identifying the type of service to which the tenant should be provisioned and each of the identified endpoint addresses;
the data center provisioner sending a request to each service instance identified by the endpoint addresses, for the load on each scale unit, the request being made via a get load function of a common interface that is implemented by each service in the multi-tenancy environment, the get load function returning a common indication of load;
selecting one of the service instances to host the tenant based on the load on each scale unit; and
the data center provisioner sending a request to the selected service instance, the request requesting that the selected service instance provision the tenant on the service, the request being made via a create function of the common interface by which the data center provisioner can request the provisioning of a tenant on a service of any type within the multi-tenancy environment.

* * * * *